United States Patent

Riefe et al.

[11] Patent Number: 5,718,132
[45] Date of Patent: Feb. 17, 1998

[54] ANTI-THEFT STEERING SHAFT LOCK

[75] Inventors: Richard Kremer Riefe; David Michael Byers, both of Saginaw; Michael Patrick Anspaugh, Bay City, all of Mich.

[73] Assignee: General Motors Corporation, Detroit, Mich.

[21] Appl. No.: 691,959

[22] Filed: Aug. 5, 1996

[51] Int. Cl.[6] .................................................. B60R 25/02
[52] U.S. Cl. ...................... 70/186; 70/252; 70/422; 74/492; 180/277
[58] Field of Search .......................... 70/182–186, 252, 70/422; 74/492; 403/2; 180/277; 280/777

[56] References Cited

U.S. PATENT DOCUMENTS

| | | | |
|---|---|---|---|
| 3,686,906 | 8/1972 | Watkins et al. | 70/252 |
| 4,584,857 | 4/1986 | Weber | 70/252 X |
| 4,903,511 | 2/1990 | Niedzielski et al. | 70/252 |
| 4,955,454 | 9/1990 | Reinert et al. | 180/287 |
| 4,972,692 | 11/1990 | Morikawa et al. | 70/186 |
| 4,987,756 | 1/1991 | Fancher | 70/186 |
| 5,092,147 | 3/1992 | Mochida et al. | 70/252 |
| 5,211,042 | 5/1993 | Watanuki | 70/252 |

*Primary Examiner*—Lloyd A. Gall
*Attorney, Agent, or Firm*—Saul Schwartz

[57] ABSTRACT

An anti-theft steering shaft lock for an energy-absorbing motor vehicle steering column having a linearly collapsible mast jacket includes a unitized construction consisting of a cylinder lock attached to an instrument panel of the motor vehicle remote from the mast jacket, a lateral housing between the cylinder lock and the mast jacket, a lock bolt in the lateral housing, rack and pinion gears which convert rotation of an element of the cylinder lock into linear translation of the lock bolt, and a frangible connection means at which an inboard part of the unitized construction adjacent the mast jacket separates from an outboard part in the direction of linear collapse of the mast jacket. The frangible connection means includes a pair of laterally aligned frangible joints between inboard and outboard segments of the lateral housing and between inboard and outboard segments of the lock bolt. The inboard part of the unitized construction constitutes a relatively small rigid appendage to the mast jacket so that the space behind the instrument panel dedicated to maintenance of a clear path for such rigid appendage is, likewise, relatively small.

5 Claims, 3 Drawing Sheets

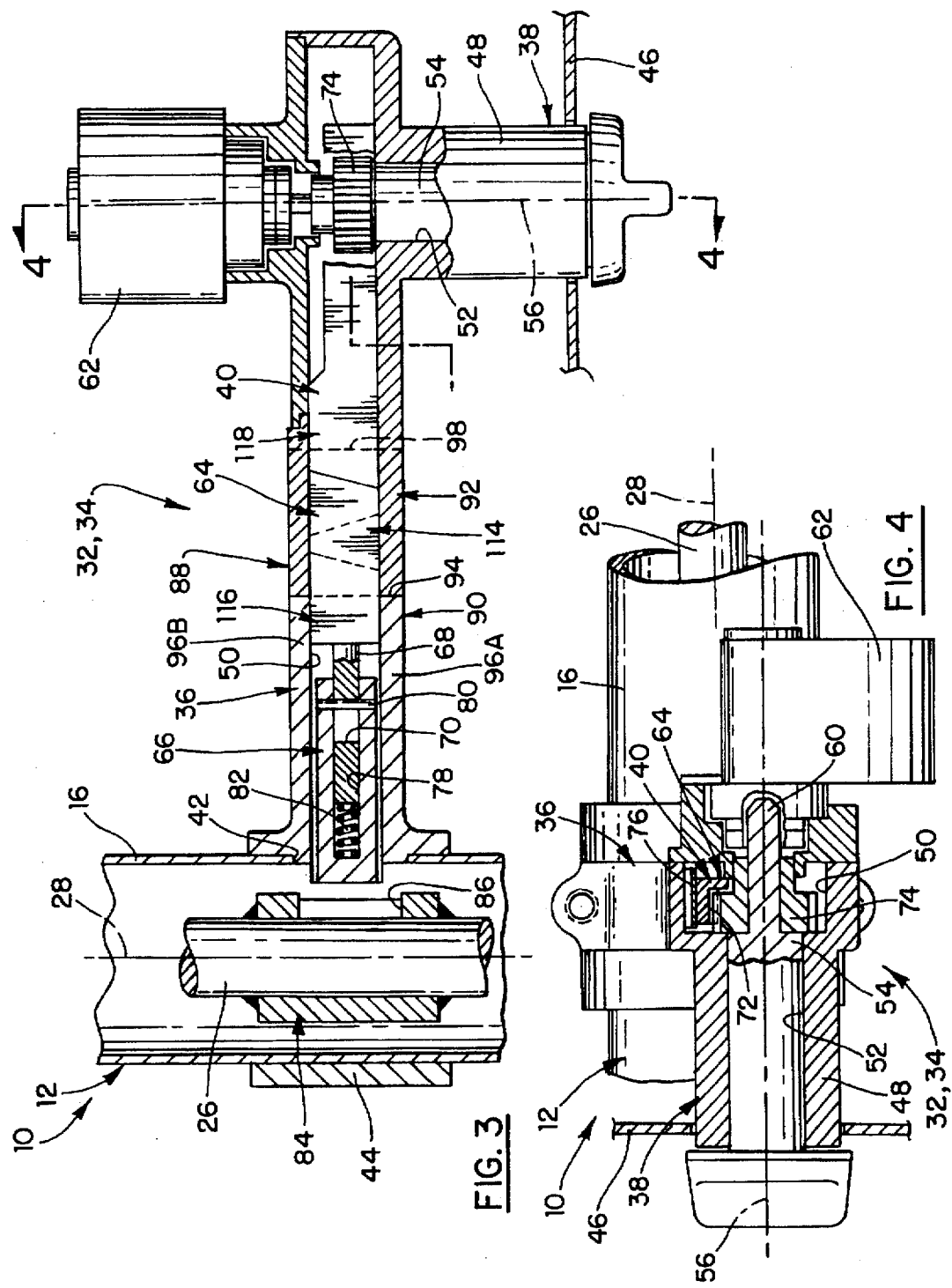

ANTI-THEFT STEERING SHAFT LOCK

FIELD OF THE INVENTION

This invention relates to anti-theft steering shaft locks on energy-absorbing motor vehicle steering columns.

BACKGROUND OF THE INVENTION

Typical energy-absorbing motor vehicle steering columns include a tubular mast which collapses linearly in response to an impact on a steering wheel on the steering column to convert into work a fraction of the kinetic energy of the impact. An anti-theft steering shaft lock of the steering column commonly includes a cylinder lock on the mast jacket and rack and pinion gears inside the mast jacket which actuate a lock bolt concurrently with rotation of an element of the cylinder lock. Alternative constructions have been proposed which include a unitized construction consisting of a cylinder lock mounted on an instrument panel of the vehicle remote from the steering column, a lock bolt in a lateral housing between the collapsible mast jacket and the cylinder lock, and rack and pinion gears which convert rotation of an element of the cylinder lock into linear translation of the lock bolt in the lateral housing. Because the aforesaid unitized construction is a rigid appendage to the mast jacket which collapses therewith, considerable space behind the instrument panel is dedicated to maintaining an unobstructed path for it. Such dedicated, unobstructed space, however, increases congestion elsewhere behind the instrument panel.

SUMMARY OF THE INVENTION

This invention is a new and improved anti-theft steering shaft lock for an energy-absorbing motor vehicle steering column having a mast jacket linearly collapsible in response to an impact on a steering wheel on the mast jacket to convert into work a fraction of the kinetic energy of the impact. The anti-theft steering shaft lock according to this invention includes a unitized construction consisting of a cylinder lock attached to an instrument panel of the motor vehicle remote from the mast jacket, a lateral housing between the cylinder lock and the mast jacket, a lock bolt in the lateral housing, rack and pinion gears which convert rotation of an element of the cylinder lock into linear translation of the lock bolt, and a frangible connection means at which an inboard part of the unitized construction adjacent the mast jacket separates from an outboard part in the direction of linear collapse of the mast jacket. The frangible connection means includes a pair of laterally aligned frangible joints between inboard and outboard segments of the lateral housing and the lock bolt. The inboard part of the unitized construction constitutes a relatively small rigid appendage to the mast jacket so that the space behind the instrument panel dedicated to maintenance of a clear path for such rigid appendage is, likewise, relatively small.

BRIEF DESCRIPTION OF THE DRAWINGS

FIG. 3 is a partially broken-away sectional view taken generally along the plane indicated by lines 3—3 in FIG. 2;

FIG. 4 is a partially broken-away sectional view taken generally along the plane indicated by lines 4—4 in FIG. 3;

DESCRIPTION OF A PREFERRED EMBODIMENT

Figure 1:
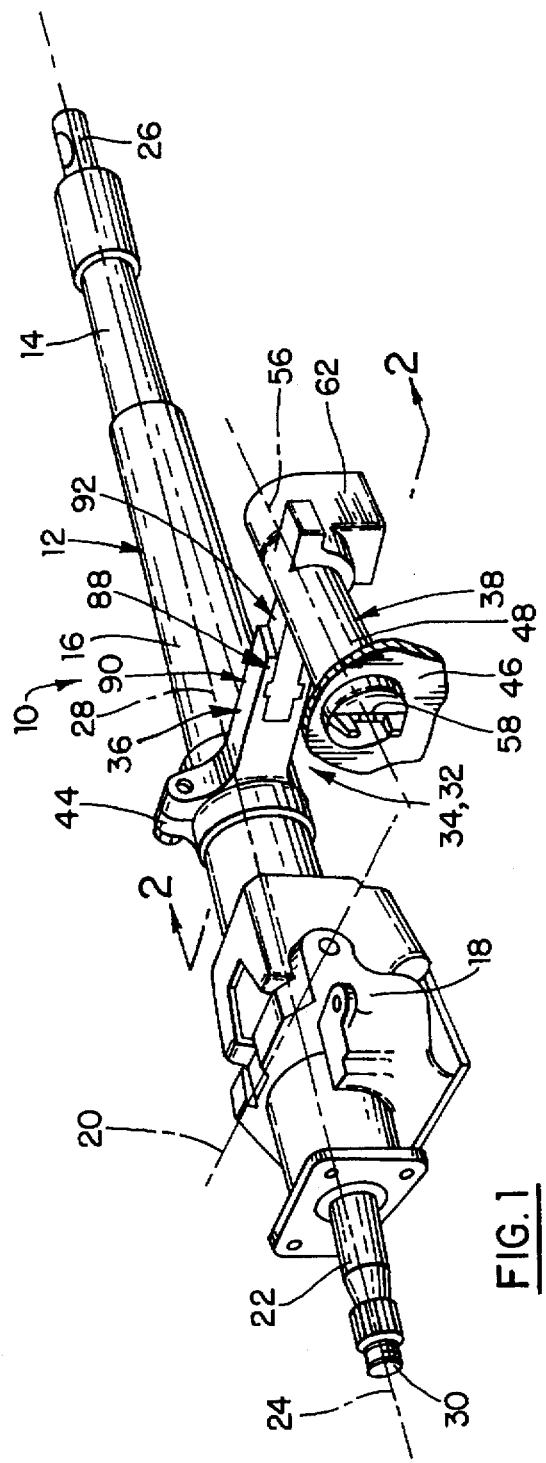
FIG. 1 is a perspective view of an energy-absorbing motor vehicle steering column having an anti-theft steering shaft lock according to this invention.
Figure 2:
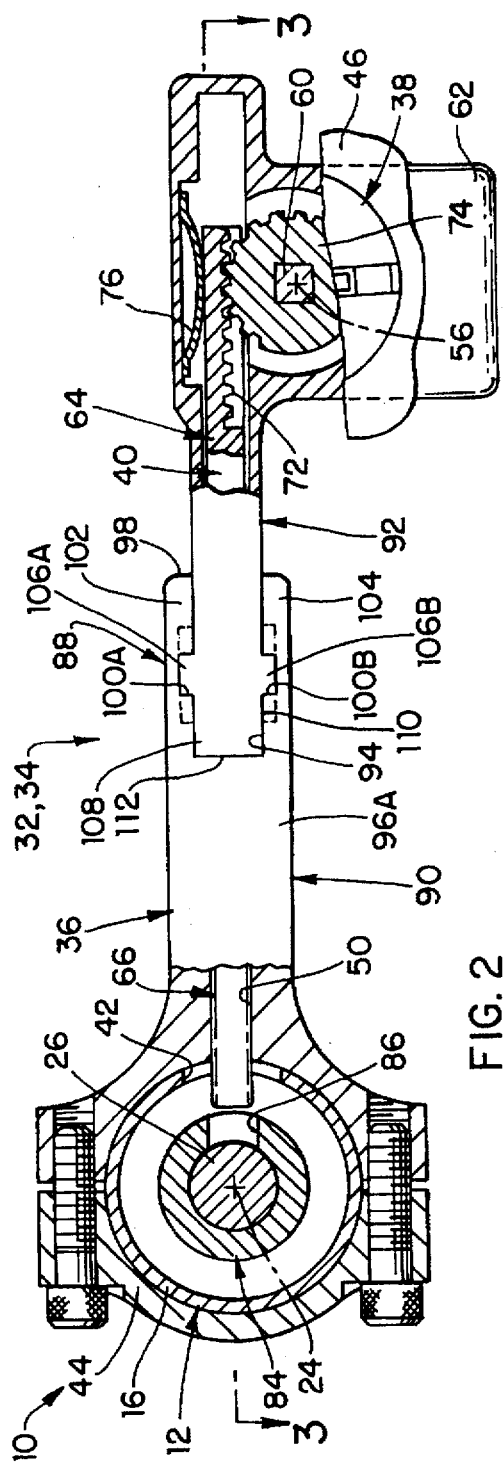
FIG. 2 is an enlarged, partially broken-away sectional view taken generally along the plane indicated by lines 2—2 in FIG. 1.

As seen best in FIGS. 1-3, a motor vehicle steering column 10 includes a mast jacket 12 consisting of a tubular lower element 14 and a tubular upper element 16 telescoped over the tubular lower element. The mast jacket 12 is attached to a motor vehicle body structure, not shown, at a lower end of the tubular lower element 14 and near an upper end of the tubular upper element 16. A tilt housing 18 is mounted on the tubular upper element 16 at the upper end thereof for pivotal movement about a lateral centerline 20 of the steering column.

An upper steering shaft 22 is supported on the tilt housing 18 for rotation about a longitudinal centerline 24 of the tilt housing. A lower steering shaft 26 is supported on the mast jacket 12 for rotation about a longitudinal centerline 28 of the steering column. The upper steering shaft 22 is connected to the lower steering shaft 26 through a universal joint, not shown, at the intersection of the longitudinal and lateral centerlines 24,28,20. In a middle position of the tilt housing 18, FIG. 1, the longitudinal centerlines 24,28 coincide. A steering wheel, not shown, is rigidly attached to a distal end 30 of the upper steering shaft in the usual fashion. Manual effort applied at the steering wheel is transferred to a steering gear, not shown, of the motor vehicle through the upper and lower steering shafts 22,26.

An energy absorber, not shown, such as described in U.S. Pat. No. 3,392,599, issued Jul. 16, 1968 and assigned to the assignee of this invention, is disposed in the annulus at the overlap between the tubular upper and lower elements 16, 14 of the mast jacket. Forces attributable to an impact on the steering wheel are transferred from the latter to the tubular upper element 16 of the mast jacket through the upper steering shaft 22 and the tilt housing 18. Such forces initiate collapse of the mast jacket characterized by linear translation of the tubular upper element 16 relative to the tubular lower element 14 in the direction of longitudinal centerline 28 and conversion by the aforesaid energy absorber of a fraction of the kinetic energy of the impact into work.

An anti-theft steering shaft lock 32 according to this invention includes a unitized construction 34 consisting of a lateral housing 36, a cylinder lock 38, and a flat lock bolt 40 in the lateral housing. The unitized construction 34 is rigidly attached to the tubular upper element 16 of the mast jacket 12 over an aperture 42 therein by a clamp 44 around the tubular upper element bolted to the lateral housing 36. The unitized construction 34 is also rigidly attached to a fragmentarily illustrated vertical instrument panel 46 of the motor vehicle through a cylindrical boss 48 of the cylinder lock 38 integral with the lateral housing 36 which protrudes through the instrument panel 46 and is attached thereto by retainers, not shown, which prevent the boss from being dislodged from the instrument panel.

An internal channel 50 in the lateral housing 36 registers with the aperture 42 in the upper element 16 of the mast jacket and intersects a cylindrical bore 52 in the cylindrical boss 48 of the cylinder lock 38. A barrel 54 of the cylinder lock is supported in the cylindrical bore 52 for rotation about a centerline 56 of the boss when a properly coded key is inserted in a slot 58 in the barrel accessible from a passenger compartment side of the instrument panel 46. The barrel 54 has a driver 60, FIG. 4, rotatable therewith about the centerline 56 which traverses the internal channel 50 in the lateral housing 36 and engages a rotor, not shown, of an ignition switch 62 of the motor vehicle mounted on the unitized construction 34. The driver 60 synchronizes electrical systems of the motor vehicle with the angular position of the barrel 54 in conventional fashion.

The flat lock bolt 40 of the unitized construction 34 is slidably disposed in the internal channel 50 of the lateral housing 36 and consists of a first element 64 and a second element 66, FIG. 3. The first element 64 of the lock bolt has an integral rod 68 at one end perforated by an elongated slot 70 and an integral linear rack gear 72 at the other end. The rack gear meshes with a pinion gear 74 on the driver 60 of the barrel 54 to achieve linear translation of the first element 64 of the lock bolt in the internal channel 50 concurrent with rotation of the barrel 54 in the cylindrical boss 48. A leaf spring 76, FIGS. 2 and 4, biases the first element 64 of the lock bolt toward the gear teeth on the pinion gear 74.

The second element 66 of the lock bolt 40 has a bore 78 which slidably receives the rod 68 on the first element 64. A retaining pin 80 on the second element 66 traverses the slot 70 to limit relative linear translation between the first and second elements to the length of the slot. A spring 82 in the bore 78 urges relative separation between the first and second elements 64,66 of the lock bolt 40.

A collar 84 on the steering shaft 26 has a slot 86 which registers with the aperture 42 in the upper element 16 of the mast jacket once during each revolution of the steering shaft about the longitudinal centerline 28. In an unlocked position of the lock bolt 40, FIGS. 2–3, in which the second element 66 of the lock bolt is remote from the slot 86, the steering shaft 26 is freely rotatable. In a locked position of the lock bolt 40, not shown, an end of the second element 66 of the lock bolt seats in the slot 86 to rotatably immobilize the steering shaft. If the slot 86 is not in register with the aperture 42 when the barrel 54 of the cylinder lock is rotated to translate the lock bolt from its unlocked position to its locked position, the second element 66 of the lock bolt bears against the collar 84 and the first element 64 compresses the spring 82. Thereafter, the lock bolt 40 automatically achieves its locked position when the spring 82 projects the second element 66 of the lock bolt into the slot 86 at the instant the latter first achieves registry with the aperture 42.

Figure 6:
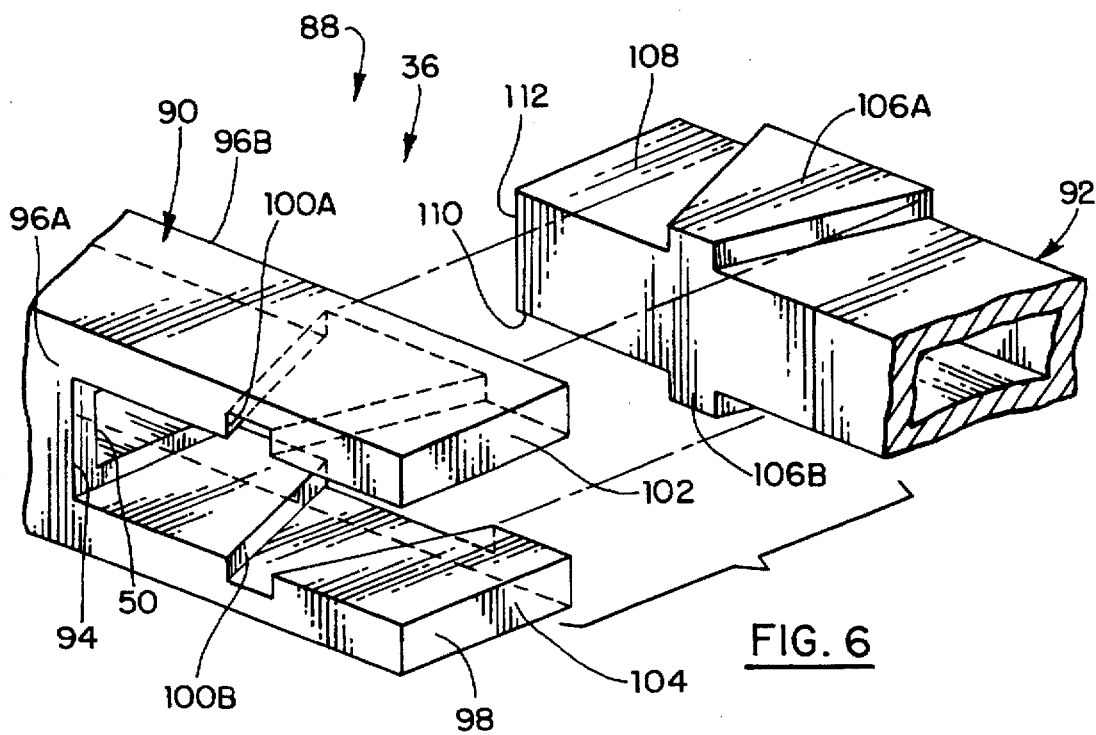
FIG. 6 is a fragmentary exploded perspective view of a lateral housing of the anti-theft steering shaft lock according to this invention.

As seen best in FIGS. 2, 3 and 6, a frangible connection means of the unitized construction 34 includes a frangible joint 88 in the lateral housing 36 which divides the latter into an inboard segment 90 rigidly connected to the mast jacket 12 and an outboard segment 92 rigidly connected to the instrument panel 46 through the cylindrical boss 48 of the cylinder lock. The frangible joint 88 includes a slot 94 through each of a pair of side walls 96A, 96B and a distal end 98 of the inboard segment 90 of the lateral housing and a pair of dovetail slots 100A, 100B in an upper wall 102 and a lower wall 104, respectively, of the inboard segment 90.

A pair of integral dovetail pins 106A, 106B are formed on respective ones of an upper wall 108 and a lower wall 110 of the outboard segment 92 of the lateral housing 36. A distal end 112 of the outboard segment 92 of the lateral housing 36 slides into the slot 94 in the inboard segment 90 parallel to the longitudinal centerline 28 of the steering column through the side wall 96B of the inboard segment until the dovetail pins 106A, 106B seat in the dovetail slots 100A, 100B, respectively. The dovetail pins and slots 106A, 106B and 100A, 100B cooperate to prevent separation between the inboard and outboard segments 90, 92 of the lateral housing perpendicular to the longitudinal centerline 28 of the steering column. The upper and lower walls 102, 104 of the inboard segment 90 prevent vertical separation between the inboard and outboard segments, i.e., perpendicular to the plane of the upper and lower walls 102, 104. The slot 94 and the dovetail pins and slots 106A, 106B and 100A, 100B permit unobstructed separation between the inboard and outboard segments 90, 92 of the lateral housing parallel to the longitudinal centerline 28 in the direction of energy-absorbing collapse of the mast jacket 12.

Figure 5:
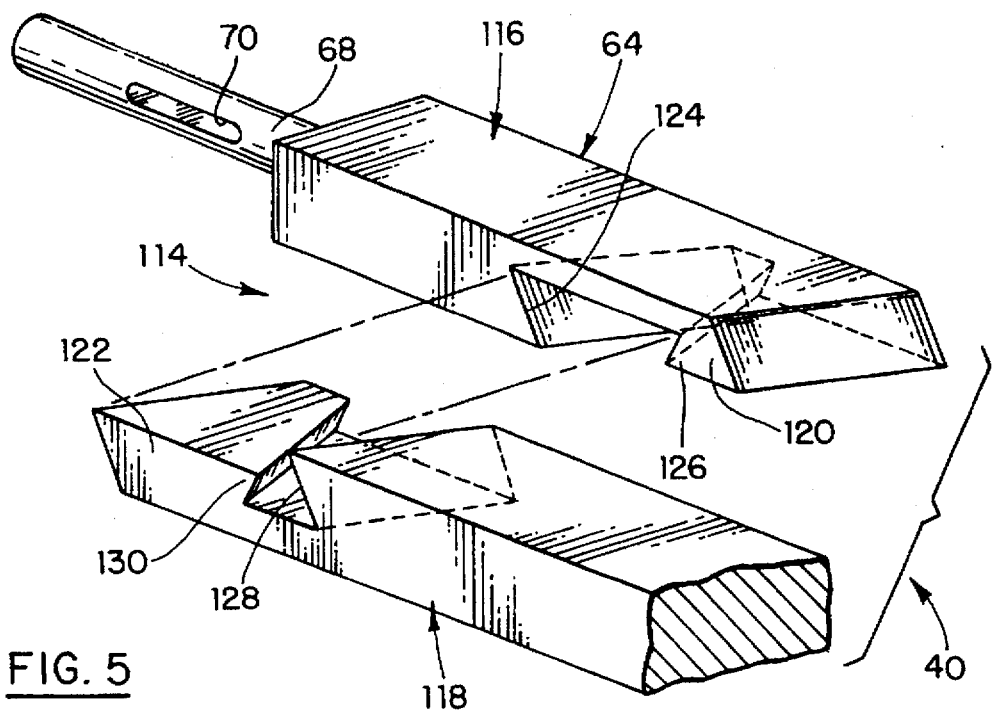
FIG. 5 is a fragmentary exploded perspective view of a lock bolt of the anti-theft steering shaft lock according to this invention.

As seen best in FIGS. 3 and 5, the frangible connection means of the unitized construction 34 further includes a frangible lap joint 114 in the first element 64 of the lock bolt 40 which divides the lock bolt into an inboard segment 116 between the lap joint and the steering shaft 26 and an outboard segment 118 between the lap joint and the pinion gear 74. The frangible lap joint 114 includes a rabbet 120 on the inboard segment 116 which overlaps a rabbet 122 on the outboard segment 118. The rabbet 120 is interrupted by a dovetail slot 124 and an adjoining dovetail pin 126 each having beveled sides. The rabbet 122 is interrupted by a dovetail slot 128 and an adjoining dovetail pin 130, each having beveled sides.

The dovetail pins 126, 130 seat in respective ones of the dovetail slots 128, 124 to unite the inboard and outboard segments 116, 118 of the lock bolt 40 for unitary linear translation in the internal channel 50 perpendicular to the longitudinal centerline 28 of the steering column. The beveled sides of the slots 124, 128 and pins 126, 130 cooperate to prevent vertical separation, i.e., perpendicular to the plane of the lock bolt 40, of the inboard and outboard segments 116, 118 at the lap joint. Parallel to the longitudinal centerline 28 in the direction of energy-absorbing collapse of the mast jacket 12 in the plane of the lock bolt, the dovetail pins 126, 130 freely release from the dovetail slots 128, 124 to accommodate separation of the inboard segment 116 from the outboard segment 118 at the lap joint 114.

In the unlocked position of the lock bolt 40 corresponding to the motor vehicle being driven in the usual fashion, the frangible lap joint 114 is aligned with the frangible joint 88 in the lateral housing, i.e., is disposed in the overlap between the distal ends 98, 112 of the inboard and outboard segments 90, 92 of the lateral housing 36, FIG. 3. If an impact on the steering wheel on the steering column initiates linear translation of the upper element 16 of the mast jacket 12 in the direction of the longitudinal centerline 28, the inboard segment 90 of the lateral housing 36 translates as a unit with the upper element 16 and freely separates from the outboard segment 92 at the frangible joint 88. Concurrently, the inboard segment of the lateral housing induces corresponding separation of the inboard segment 116 of the lock bolt 40 from the outboard segment 118 at the frangible lap joint 114. Because only the inboard segments 90, 116 translate as a unit with the upper element 16 of the mast jacket 12, the space on the vehicle body behind the instrument panel 46 dedicated to providing an obstruction-free path for the rigid appendage to the upper element 16 consisting of the inboard segments 90, 116 of the lateral housing and the lock bolt is considerably less than is required to accommodate a rigid appendage consisting of the entire unitized construction 34 in the fashion of the aforesaid prior anti-theft steering shaft locks.

What is claimed is:

1. An anti-theft steering shaft lock for an energy-absorbing motor vehicle steering column including a mast jacket having a mast jacket element collapsible in a direction of a direction of a longitudinal centerline of said steering column in response to an impact on said steering column and a steering shaft rotatably supported on said mast jacket, said anti-theft steering shaft lock including a lateral housing having an internal channel, means operative to rigidly connect said lateral housing to said mast jacket element, a lock bolt disposed in said internal channel for linear translation perpendicular to said longitudinal centerline of said mast jacket between a locked position engaging a keeper on said steering shaft to rotatably immobilize said steering shaft and an unlocked position remote from said keeper on said steering shaft, and a cylinder lock means adapted to be rigidly connected to a panel of a body of said motor vehicle remote from said steering column and to said lateral housing including a rotatable barrel and a gear means between said barrel and said lock bolt operative to linearly translate said lock bolt between said locked and said unlocked positions concurrent with rotation of said barrel, characterized in that said anti-theft steering shaft lock further comprises:

a first frangible joint means in said lateral housing operative to divide said lateral housing into an inboard segment adapted to be rigidly attached to said collapsible mast jacket element and an outboard segment rigidly attached to said cylinder lock means and to rigidly unite said inboard and said outboard segments except parallel to said longitudinal centerline of said steering column in said direction of collapse of said collapsible mast jacket element so that said inboard segment of said lateral housing collapses as a unit with said collapsible element of said mast jacket relative to said outboard segment of said lateral housing, and a second frangible joint means in said lock bolt aligned with said first frangible joint means in said lateral housing in said unlocked position of said lock bolt operative to divide said lock bolt into an inboard segment in said inboard segment of said lateral housing and an outboard segment in said outboard segment of said lateral housing and to rigidly unite said inboard and said outboard segments of said lock bolt except parallel to said longitudinal centerline of said steering column in said direction of collapse of said collapsible mast jacket element so that said inboard segment of said lock bolt collapses as a unit with said collapsible element of said mast jacket and with said inboard segment of said lateral housing relative to said outboard segment of said lock bolt.

2. The anti-theft steering shaft lock recited in claim 1 wherein said first frangible joint means in said lateral housing comprises:

a linear slot in a distal end of said inboard segment of said lateral housing parallel to said longitudinal centerline of said steering column open through each of a pair side walls of said inboard segment of said lateral housing, a distal end of said outboard segment of said lateral housing being slidably received in said linear slot with a top wall of said outboard segment facing a top wall of said inboard segment and a bottom wall of said outboard segment facing a bottom wall of said inboard segment of said lateral housing, a slot in said top wall of said inboard segment of said lateral housing, a slot in said bottom wall of said inboard segment of said lateral housing, a pin on said top wall of said outboard segment of said lateral housing seated in said slot in said top wall of said inboard segment of said lateral housing, and a pin on said bottom wall of said outboard segment of said lateral housing seated in said slot in said bottom wall of said inboard segment of said lateral housing.

3. The anti-theft steering shaft lock recited in claim 2 wherein:

said slot in said top wall of said inboard segment of said lateral housing is a dovetail slot, said slot in said bottom wall of said inboard segment of said lateral housing is a dovetail slot, said pin on said top wall of said outboard segment of said lateral housing is a dovetail pin, and said pin on said bottom wall of said outboard segment of said lateral housing is a dovetail pin.

4. The anti-theft steering shaft lock recited in claim 1 wherein said second frangible joint means in said lock bolt comprises:

a lap joint including a first rabbet on said inboard segment of said lock bolt, a second rabbet on said outboard segment of said lock bolt, a slot in said first rabbet, and a pin on said second rabbet received in said slot in said first rabbet to unite said inboard and said outboard segments of said lock bolt for unitary linear translation perpendicular to said longitudinal centerline of said steering column and to permit separation of said inboard segment of said lock bolt from said outboard segment of said lock bolt parallel to said longitudinal centerline of said steering column in the direction of linear collapse of said collapsible element of said mast jacket.

5. The anti-theft steering shaft lock recited in claim 4 wherein:

said slot in said first rabbet is a dovetail slot, and said pin on said second rabbet is dovetail pin.

* * * * *